C. R. RAGSDALE.
DEMOUNTABLE RIM.
APPLICATION FILED JUNE 21, 1917.

1,275,745.

Patented Aug. 13, 1918.
2 SHEETS—SHEET 1.

WITNESSES
Frederick Wiehl.
Geo. L. Beeler.

INVENTOR
C. R. Ragsdale
BY
ATTORNEYS

C. R. RAGSDALE.
DEMOUNTABLE RIM.
APPLICATION FILED JUNE 21, 1917.
1,275,745.
Patented Aug. 13, 1918.
2 SHEETS—SHEET 2.
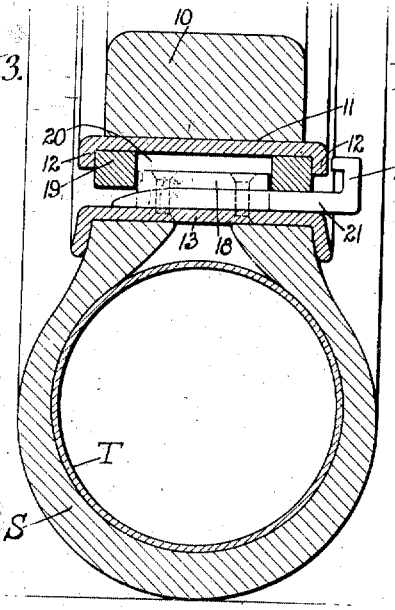
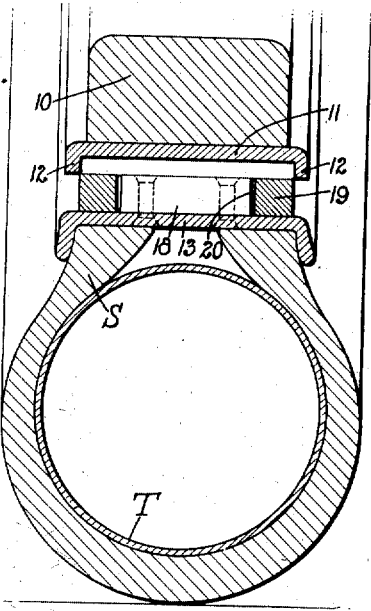
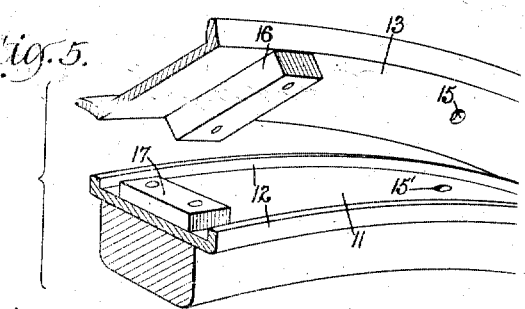
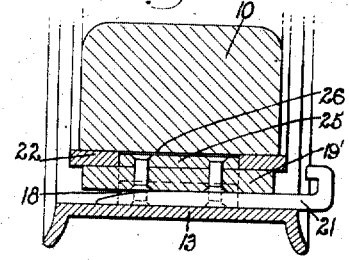
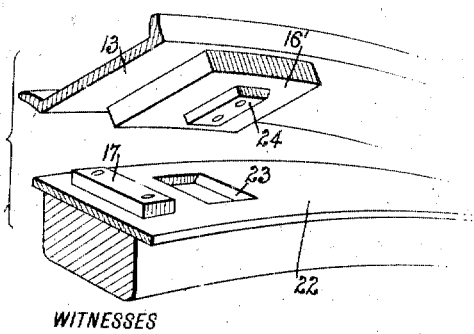
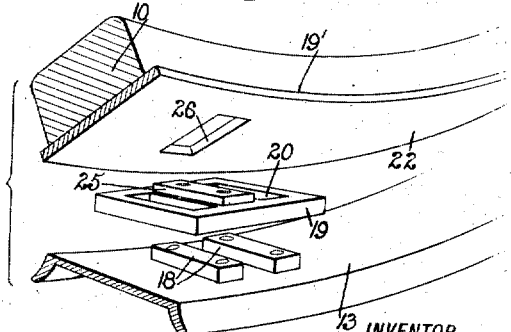
WITNESSES
Frederick Diehl.
Geo. H. Beeler.
INVENTOR
C. R. Ragsdale
BY
ATTORNEYS

UNITED STATES PATENT OFFICE.

CHARLES R. RAGSDALE, OF ST. LOUIS, MISSOURI.

DEMOUNTABLE RIM.

1,275,745.

Specification of Letters Patent. Patented Aug. 13, 1918.

Application filed June 21, 1917. Serial No. 176,074.

*To all whom it may concern:*

Be it known that I, CHARLES REED RAGSDALE, a citizen of the United States, and resident of St. Louis, in the State of Missouri, have invented a new and Improved Demountable Rim, of which the following is a full, clear, and exact description.

This invention relates to wheels having interchangeable pneumatic tires or their equivalent and has particular reference to simple, reliable and easily operated means for effecting the interchange of the tire supporting rims.

A further object of the invention is to provide a demountable rim construction for wheels in which no bolts, nuts, or wedges are required to hold the tire supporting rim on the felly or felly rim.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 3 is a vertical transverse section of the wheel on the line 3—3 of Fig. 1 showing the parts in locked position.

Fig. 4 is a view similar to that of Fig. 3 prior to the insertion of the keeper.

Fig. 5 is a fragmentary detail view of the upper portion of the wheel and showing particularly one pair of coöperating lugs or blocks secured to the tire rim and felly rim respectively.

Fig. 6 is a view of a modification of the parts represented by Fig. 5.

Fig. 7 is a modification of the parts represented in Fig. 2; and

Fig. 8 is a cross section assembly view of the form shown in Fig. 7.

Figure 1:
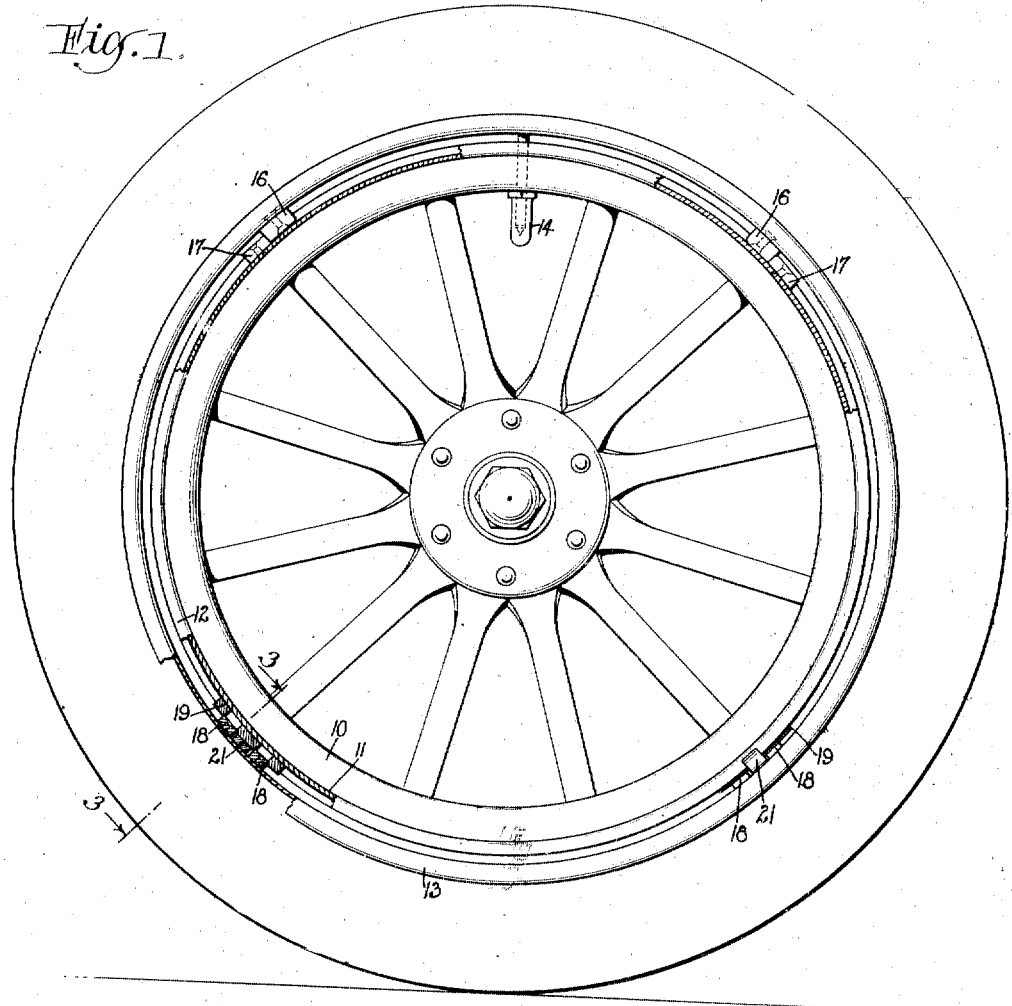
Figure 1 is a side elevation of a conventional form of wheel showing my improvement applied thereto, parts being broken away to better illustrate the interlocking features of my improvement.

Referring now more particularly to Figs. 1 to 5 I show a wheel comprising a felly 10 to which is connected in any well known manner a felly rim or band 11 having parallel outwardly projecting edge flanges 12.

13 indicates a tire supporting rim adapted for coöperation with any suitable or conventional form of shoe S having an inner tube T to which is connected an air valve 14.

While the parts thus far described may be of any suitable or conventional design or construction, it is desirable and contemplated within the scope of this invention that both of the rims may be solid around their circumferences, and hence the tire rim 13 is designed so that its inner circumference will be as great as that of the periphery of either of the flanges 12 or the smaller of them if the flanges are of different diameters whereby the tire rim may be passed readily over said flanges 12.

The shoe S carrying the tube T will be so placed upon the tire rim 13 as to have the air valve 14 extend inwardly through a hole 15 formed in said rim. The felly rim and felly are likewise provided with a hole 15' adapted to register with the hole 15 for the accommodation of the valve as has been done heretofore.

I will now specifically describe my improved interlocking devices for securing the tire rim and tire to the felly band. I call attention first of all to a pair of blocks or plates 16 riveted or otherwise rigidly secured upon the inner surface of the tire rim on opposite sides circumferentially of the valve hole 15 and spaced from each other approximately 90 degrees for an ordinary wheel. The length of each block 16 corresponds substantially to the width of the inner surface of the tire rim 13 or at any rate to the space between the flanges 12 of the felly rim, one purpose of these blocks 16 being to prevent lateral movement of the tire rim by reason of the abutting of the ends of the blocks 16 against the flanges 12 in practice.

A pair of plates 17 are riveted or otherwise rigidly secured to the felly rim 11 between the flanges 12 thereof. These plates are located on opposite sides circumferentially of the hole 15 and so spaced from each other and from said hole that the edges thereof nearest to the hole are adapted to abut squarely against the edges of the blocks 16 farthest from the valve hole 15 in practice. It follows therefore that while the flanges 12 abutting against the ends of the blocks prevent lateral movement of the tire rim in either direction, circumferential movement of the tire rim is prevented positively by one of the plates coöperating with its block and circumferential movement of the tire in the opposite direction is prevented by the other pair of members 16 and 17, as will be seen in Fig. 1. It will be noted also in this figure that the thickness of the blocks 16 with respect to the radius of the wheel corresponds substantially to the normal space between the main portions of the two rims 11 and 13.

At any other convenient portions of the rims, usually at two points on ordinary wheels, I provide pairs of lugs 18 shown in this case as two in number and secured rigidly in any suitable manner as by riveting to the inner surface of the tire rim 13 and diametrically opposite the pairs of locking plates 16 and 17. Each pair of lugs 18 are spaced a slight distance from each other circumferentially of the rim and the lugs are located centrally of the tire rim 13 or midway between the side edges or flanges thereof.

19 indicates a locking plate curved to conform to the outer face of the felly rim 11 and having a lateral width equal to the space between the flanges 12. This plate is provided with a pair of parallel slots 20 shown as of rectangular form and adapted to receive the pair of lugs 18. It will thus be seen that with the plate 19 coöperating with the two lugs 18 and with the side edges or ends of the plate abutting against the inner faces of the flanges 12 it will be impossible for the rim 13 adjacent to these features to be displaced laterally of the felly rim 11.

The manner of assemblage may be briefly summarized as follows in view of the foregoing description of the mechanism: With the wheel jacked up and turned with the plates 17 and hole 15' at the top the tire rim and tire secured thereto will then be placed over the top of the felly rim with the valve 14 projected through the hole 15', the lugs 16 coming down against or toward the then upper edges of the plates 17. The locking plates 19 then being fitted loosely upon the respective pairs of lugs 18 the bottom of the tire and tire rim may pass freely into or toward the general plane of the wheel and occupy the position shown in Fig. 4, it being noted that the radial dimension or thickness of the lugs and locking plate is no greater than the space between the tire rim 13 and that flange 12 over which said tire rim is moved. The next step then is to insert a keeper 21 for each locking plate 19. This keeper is introduced laterally from the side of the wheel so as to occupy a position between the two lugs 18 of each pair and also between a locking plate 19 and the inner surface of the rim 13, the keeper serving thereby to force the locking plate radially toward the axis of the wheel so as to occupy a snug position between the flanges 12 of the felly rim 11 as shown in Fig. 3. From this figure it will be observed that the thickness of the plate is greater than the radial width of the flanges 12 and also that the combined radial thickness of the lugs 18 and the plate 19 in interlocking position is greater than the clear space between the flanges 12 and the tire rim, whereby it is impossible for this part of the tire rim to be displaced laterally from the felly rim. In order to demount the tire and rim all that is necessary is to withdraw the keepers 21 which may be done in any suitable manner either by applying a tool to the hooked outer end 21' thereof or by driving the same outward from the inner side. When the keepers are withdrawn the locking plates 19 are free to drop downwardly or outwardly clear of the flanges 12, when the tire and tire rim 13 may be removed from the wheel, by a simple operation reverse to the steps of assemblage above set forth.

Figs. 6, 7 and 8 indicate that adaptation of my invention for use in connection with a felly rim or band 22 having a smooth outer surface or without flanges corresponding to the flanges 12. I employ, however, plates 17 secured to this band similarly to those shown in connection with the rim 11 and for similar purpose. Adjacent to each of the plates 17 the band 22 is formed with a transverse slot 23 with which coöperates a lug extension 24 of the block 16' carried by the tire rim 13. While the block 16' coöperates with the plate 17, as above described, to prevent circumferential movement of the tire rim with respect to the felly band the extension 24 projecting into the slot 23 will prevent lateral movement by reason of the abutting of the ends of the extension 24 against the end walls of the slot. In other words the coöperation between the extension 24 and the walls of the slot 23 takes the place of the coöperation between the block 16 and the flanges 12 of Fig. 5.

Figure 2:
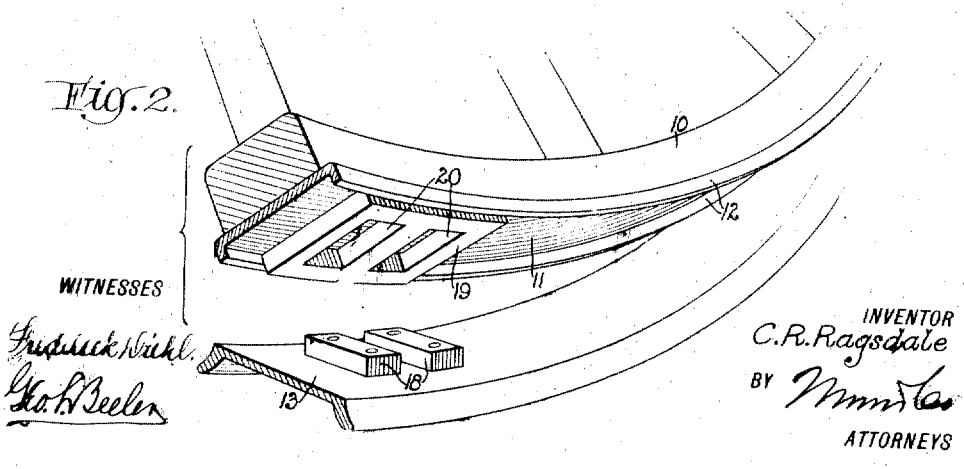
Fig. 2 is a fragmentary detail view indicating a preferred form of locking plate and the parts coöperating therewith and indicating what will be regarded in this specification for convenience of description, as the bottom portion of the wheel.

At the bottom of the wheel the pairs of lugs 18 are secured to or formed on the tire rim 13 substantially the same as shown in Fig. 2, the keeper 21 acting between said lugs. The locking plate 19' while coöperating with the lugs 18 in the slots 20 as already explained, a lug extension 25 carried by the inner face of the locking plate is adapted to project into a slot 26 formed in the felly band 22 for a purpose analogous to the interlocking of the extension 24 in the slot 23. The manner of assemblage of this form of device is the same as that already described in connection with Fig. 1, the locking plate being carried loosely upon the lugs 18 and against the inner surface of the rim 13 when said rim is being put in place upon the wheel. At this time the inner edge or surface of the extension 25 lies below and clear of the felly band 22, when however the tire rim is in place the extension 25 is forced snugly into the slot 26 by the operation of the keeper 21. By using a sufficient number of these locking plates 19' the tire rim will be locked from lateral displacement upon the felly band quite as securely as if the flanges 12 were used. Obviously the entering edges or corners of the interlocking blocks or lug extensions may be rounded or beveled as may be desired to facilitate the manipulation of the device.

I claim:

1. In a demountable rim construction, the combination of a wheel having a felly rim thereon, a pair of outwardly projecting plates carried by the rim, an endless unbroken tire rim surrounding the felly rim, a pair of blocks carried upon the inner surface of the tire rim and spaced circumferentially from each other approximately 90 degrees and projecting into engagement with the felly rim and also abutting against said plates to prevent relative circumferential movement between the rims in either direction, the felly rim being so constructed that portions of the blocks coöperate therewith to prevent lateral movement of the tire rim, and means coöperating with other portions of the two rims to lock the same in place and to make the interlocking engagement between the blocks and felly rim positive and secure.

2. In a demountable rim construction, the combination of a wheel including a felly rim, a tire rim surrounding the same, means acting between the two rims along one portion of the circumference of the wheel serving to prevent relative movement between the rims either laterally or circumferentially and other means coöperating with another circumferential portion of the wheel serving to make the first mentioned interlocking means positive and secure and also serving to prevent relative lateral movement between the two rims, the last mentioned interlocking means including a pair of lugs fixed to one of the rims, a loose locking plate coöperating with said lugs and movable radially of the wheel along the same into interlocking engagement with the other rim, and a keeper fitted removably between said lugs and serving to force said plate snugly into interlocking engagement with the rim not having the lugs.

3. In a demountable rim, the combination with a wheel including a felly rim and a tire rim surrounding the same, of interlocking blocks and plates carried by one circumferential portion of the two rims and serving to prevent relative movement between the same either circumferentially or laterally, said blocks and plates being brought into interlocking position by a movement of the tire rim in a diametrical direction while the opposite circumferential portion of the tire rim is slipped freely over the corresponding portion of the felly rim in a direction approximately parallel to the axis of the wheel, interlocking means between the latter mentioned portion of the wheel and the tire rim surrounding the same, said last mentioned interlocking means including a pair of spaced lugs carried upon the inner surface of the tire rim, a loose locking plate having a pair of openings corresponding to said lugs and fitted over the same and adapted to move radially of the wheel into engagement with the felly rim, means acting between the plate and the felly rim to prevent relative lateral movement between the rims adjacent thereto and a keeper located circumferentially between the lugs and radially between the plate and the tire rim serving to hold the locking plate in snug interlocking engagement with the felly rim.

CHARLES R. RAGSDALE.